April 6, 1954 H. M. ROBBINS 2,674,732

ELECTRONIC VARIABLE DELAY CIRCUITS

Filed Dec. 2, 1952

INVENTOR.
HOWARD M. ROBBINS,
BY
Seymour M. Rosenberg
ATTORNEY.

Patented Apr. 6, 1954 2,674,732

UNITED STATES PATENT OFFICE 2,674,732

ELECTRONIC VARIABLE DELAY CIRCUITS

Howard M. Robbins, Los Angeles, Calif., assignor to Hughes Tool Company, Houston, Tex., a corporation of Delaware Application December 2, 1952, Serial No. 323,623

6 Claims. (Cl. 340—347)

This invention relates to electronic variable delay circuits, and more particularly to electronic variable delay circuits for producing output signals corresponding to applied input signals after a predetermined delay, the delay being represented and controlled by electrical signals, in a predetermined binary code.

While variable delay circuits of the type provided by the present invention have many applications, they are especially useful in sorting systems where randomly-spaced sets of input signals are recorded into an evenly-spaced sequence. The variable delay circuit in such a system responds to the randomly-spaced sets of signals and to electrical control signals indicating the delay required for each of the sets of signals to produce evenly-spaced sets of output signals.

One example of such a system is the sorting system described in copending U. S. application for patent entitled "Electronic Sorting Systems" by H. M. Robbins, Serial No. 323,624, filed December 2, 1952. In the system described in the copending application to Robbins, input signal sets corresponding to randomly-recorded information groups are selectively sorted to provide randomly-spaced sets of signals. The variable delay circuit provided by the present invention is utilized to convert the randomly-spaced sets of signals into an evenly-spaced sequence in order to minimize the amount of storage capacity required.

The variable delay circuit in the above-described sorting system is initially set at its maximum delay value under control of a delay control circuit producing the controlling electrical signals, and then is controlled to decrease the delay by a predetermined amount each time a space between the randomly-spaced sets of signals is detected. As a result, the variable delay circuit functions to compensate for the spaces between the selected sets of signals so that the spacing between succeeding sets is uniform.

Another example of a system wherein randomly-spaced sets of signals must be recorded into an evenly-spaced sequence is one wherein information groups represented by sets of signals are to be extracted out of a sequence according to an identification code. A system of this type is shown in U. S. Patent No. 2,588,049, entitled "Comparing Device" by R. A. Rowley, issued March 4, 1952. In this system, an input tape having a sequence of items, each including a code number, is searched in order to select certain items having a predetermined code number. Whenever an item is found having the desired code number, it is extracted or read from the input tape and recorded on an output tape. The system described in the patent to Rowley does not utilize a variable delay circuit, but obtains an evenly-spaced record of the selected items by moving the output tape only after an item has been selected and recorded.

Systems of the type described in the patent to Rowley, referred to above, are limited as to the speed of operation which is possible, either by the intermittent motion required in the selecting and recording process or by the time required in accelerating and decelerating the mass of the recording material itself.

When variable delay circuits, designed according to the present invention, are utilized in sorting and extracting systems, it is possible to achieve continuous operation while producing an evenly-spaced record of the selected information. The present invention, therefore, makes it possible to construct sorting and extracting systems which do not require special starting and stopping devices; and, consequently, are simpler and may be operated at higher speeds than similar prior art systems.

An additional feature of the present invention is that the variable delay circuit itself may be constructed with a minimum of circuit elements. A plurality of delay sections, having delays specified in accordance with a geometric progression in powers of two, are interconnected by means of electrical gating circuits. The electrical gating circuits are controlled by electrical signals which represent the desired delay in a predetermined binary code.

In a specific embodiment of the present invention which is illustrated, the delay sections have delays of: 1; 2; 4; 8 . . ., time intervals, respectively; the time intervals being of any reference length. A delay of 5, then, is provided when the controlling electrical signals represent the binary number 1010000 . . ., so that the applied signals pass through the first and third delay sections under the control of 1-representing electrical signals, but bypass all of the other delay sections under the control of 0-representing electrical signals.

Since $2^S$ delays are possible with S delay sections, it is apparent that with only four delay sections, it is possible to provide sixteen different delays, one of which is equal to zero.

Another important feature of the variable delay circuit of the present invention is that it may be utilized in high-speed electronic systems, where it is necessary to change a delay within a few microseconds. This results from the fact that the delay control is provided by electrical signals which may be varied at very high frequencies.

Accordingly, it is an object of the present invention to provide a variable delay circuit for producing output signals in response to applied input signals after a predetermined delay, the delay being represented and controlled by electrical signals in a predetermined binary code.

Another object of the present invention is to provide a variable delay circuit responsive to randomly-spaced sets of input signals for producing corresponding evenly-spaced sets of output signals.

An additional object of the present invention is to provide a variable delay circuit requiring a minimum number of delay sections.

A further object of the present invention is to provide a variable delay circuit which may be controlled at high speed by means of delay-representing binary coded electrical signals.

Still another object of the present invention is to provide a variable delay circuit having delay sections valued according to a geometrical progression in powers of two, said variable delay circuit being controllable by binary-coded electrical signals.

The novel features which are believed to be characteristic of the invention, both as to its organization and method of operation, together with further objects and advantages thereof, will be better understood from the following description considered in connection with the accompanying drawings, in which one embodiment of the invention is illustrated by way of example. It is to be expressly understood, however, that the drawings are for the purpose of illustration and description only, and are not intended as a definition of the limits of the invention.

Figure 1:
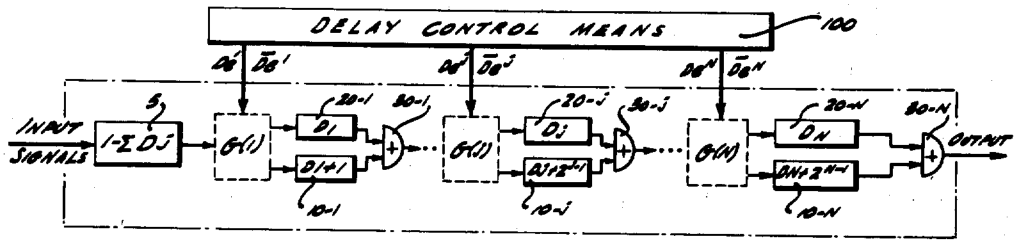
Fig. 1 is a block diagram of one embodiment of the variable delay circuit of the present invention.

Referring now to Fig. 1, there is shown one embodiment of a variable delay circuit according to this invention in which electrical output signals corresponding to applied electrical input signals are produced after a predetermined delay. The variable delay circuit of Fig. 1 comprises: an input delay section 5 for receiving the input signals; a series of 1st, . . . $j$th, . . . and Nth first delay sections designated as 10–1, . . . 10–$j$, . . . and 10–N, respectively; a corresponding series of 1st, . . . $j$th, . . . and Nth second delay sections, designated as 20–1, . . . 20–$j$, . . . and 20–N, respectively; electrical gating circuits G(1), . . . G($j$), . . . and G(N), one for each corresponding pair of first and second delay sections; 1st, . . . $j$th, . . . and Nth, "or" circuits designated as 30–1, . . . 30–$j$, . . . and 30–N, respectively, one for each corresponding pair of delay sections; and delay control means 100 for producing complementary electrical signals $De^1$, $\overline{De^1}$, . . . $De^j$, . . . $\overline{De^j}$ . . . and $De^N$, $\overline{De^N}$ for actuating the electrical gating circuits G(1), . . . G($j$), . . . and G(N), respectively. The variable $j$, utilized above and hereinafter, designates any of the integers 1 through N, where N is the total number of first or second delay sections.

Each electrical gating circuit, referred to as G($j$), responds to signals $De^j$ and $\overline{De^j}$ produced by delay control means 100 to produce signals which are applied to first and second delay sections 10–$j$ and 20–$j$. The signals produced by delay sections 10–$j$ and 20–$j$ are combined in an "or" circuit 30–$j$, which may also be considered as a buffer circuit. The output signal of each "or" circuit 30–$j$ is applied to the following or ($j+1$)st, electrical gating circuit.

Input signals are applied to delay section 5, connected to electrical gating circuit G(1); and corresponding output signals are produced by "or" circuit 30–N, after a delay represented and controlled by delay control means 100.

Each first delay section 10–$j$ produces output signals in response to applied input signals after a delay of $D_j+2^{j-1}$ time intervals, where $D_j$ is not a function of the variable $j$, although it may be different for each delay section. In a 4-delay-section system (i. e. $N=4$), then, the first, second, third and fourth first delay sections provide delays of $D_1+1$, $D_2+2$, $D_3+4$, and $D_4+8$ time intervals, respectively.

Each second delay section 20–$j$ produces output signals in response to applied input signals after a delay equal to $D_j$ time intervals. Consequently, the difference between the delay provided by corresponding first and second $j$th delay sections is always equal to $2^{j-1}$ time intervals.

Input delay section 5 provides a delay equal to $1-\Sigma D_j$ time intervals, where $\Sigma D_j$ is the sum of all delays $D_j$. Since the $j$th first and second delay sections each includes a delay of $D_j$, $\Sigma D_j$ remains the same regardless of the path of signals through the variable delay circuit, and the sum of the delay of section 5 and $\Sigma D_j$, through any combination of the first and second delay sections, is always equal to 1. As a result, each delay provided by the variable delay circuit is equal to 1 plus the sum of the delays provided by the first delay sections. If signals are caused to pass through all of the first delay sections, then a maximum delay of: $1+1+2+4 \ldots +2^{N-1}=2^N$ is provided. If signals are caused to bypass all of the first delay sections, then a delay of 1 is provided. It is apparent, then, that signals $De^j$ and $\overline{De^j}$ may be utilized to control any one of $2^N$ delays.

One of complementary signals $De^j$ and $\overline{De^j}$ is utilized to control the entry of signals into the $j$th first delay section 10–$j$, and the other is utilized to control the entry of signals into the $j$th second delay section 20–$j$. In the discussion which follows it is assumed that signals $De^j$ and $\overline{De^j}$ control the entry of signals into the $j$th first delay section 10–$j$ and $j$th second delay section 20–$j$, respectively. When signals $De^j$ and $\overline{De^j}$ are equal to 1 and 0, respectively, the signals applied to electrical gating circuit G($j$) are then applied to first delay section 10–$j$; and when signals $De^j$ and $\overline{De^j}$ have values of 0 and 1, respectively, signals applied to electrical gating circuit G($j$) are then applied to second delay section 20–$j$. It is apparent, however, that the other or complementary arrangement is equally suitable.

Since the $j$th first delay section 10–$j$ is bypassed when signal $\overline{De^j}$ is equal to 1 and is included in the total delay when signal $De^j$ is equal to 1, it is possible to define each of the $2^N$ delays which are possible as an "and" function of the variables $De^j$ and $\overline{De^j}$. The delays of 1, 4, 6, and $2^N$, for example, may be represented as follows:

Delay of $1=\overline{De^1}.\overline{De^2} \ldots \overline{De^N}$

Delay of $4=De^1.De^2.\overline{De^3} \ldots \overline{De^N}$

Delay of $6=De^1.\overline{De^2}.De^3.\overline{De^4} \ldots \overline{De^N}$

Delay of $2^N=De^1.De^2.De^3 \ldots De^N$ where the dot (.) represents the logical "and". When a delay of 1 is provided, all first delay sections are bypassed, and consequently, signals $\overline{De^1}$ "and" $\overline{De^2}$ . . . "and" $\overline{De^N}$ are equal to 1. Thus, the corresponding "and" function has the value of 1. Similarly, it should be apparent that a delay of 4 is provided by passing signals through first delay sections 10–1 and 10–2, and second delay sections 20–3, . . . and 20–N; a delay of 6 is provided by passing signals through first delay sections 10–1 and 10–3, and second delay sections 20–2, 20–4, . . . and 20–N; and a delay of $2^N$ time intervals is provided by passing signals through first delay sections 10–1, 10–2, 10–3, . . . and 10–N.

Signals $De^j$ and $\overline{De^j}$ produced by delay control means 100 may be provided by any of the well-known types of bistable devices or trigger circuits, such as those shown on pages 351 through 356 of Theory and Applications of Electron Tubes by Herbert J. Reich, Ph.D., published in 1944 by McGraw-Hill Book Company, Inc. For example, in a circuit of the type shown in Fig. 10–7 on page 354, the anode of tube $T_1$ may be utilized to provide signal $De^j$ and the anode of tube $T_2$ to provide signal $\overline{De^j}$. Then, when tube $T_2$ is conducting and $T_1$ is cut off, signal $De^j$ is equal to 1 and $\overline{De^j}$ is equal to 0; and when tube $T_1$ is conducting and tube $T_2$ is cut off, signal $De^j$ is equal to 0 and $\overline{De^j}$ is equal to 1.

Signals indicating the delay desired may be entered into the bistable devices of delay control means 100 in many ways. For example, all bistable devices may be set in parallel, thus making it possible to change from one delay to another at the speed at which the individual bistable devices may be set, which generally is on the order of microseconds. Another manner of entering delay control signals is to interconnect the bistable devices as a shifting register, the signals then being entered by shifting them in serially. When the delay is to be continually increased or decreased in response to control signals, the bistable devices are interconnected as a binary counter. Then, counting signals are applied to the first bistable device of the counter, causing it to count up or down according to the delay which is desired. The operation of a delay control circuit in this manner is described in the above-mentioned copending U. S. patent application to Robbins.

The delay sections utilized in the variable delay circuit may be of any of the well-known types. For example, suitable types of delay circuits are described in an article entitled "Improved Ultrasonic Delay Lines" by F. A. Metz et al., in vol. XXII of Electronics, July, 1949, on pages 96–100; mercury delay lines which may be utilized are described in an article entitled "Design of Mercury Delay Lines (Sonic-Delay-Line Storage)" by T. K. Sharpless in vol. XX of Electronics, November, 1947, on pages 134–138; and lumped-constant delay lines are described in an article entitled "Improved Pulse Stretcher" by J. F. Craib in vol. XXIV of Electronics, June, 1951, on pages 129–131.

In a digital computer utilizing a magnetic drum type of memory it may be convenient to use the drum to provide the delay sections. A delay is derived from a magnetic drum by reading signals, previously recorded, later in the drum cycle. An arrangement of reading and writing heads on a magnetic drum for providing the delay sections is shown in Fig. 2.

Figure 2:
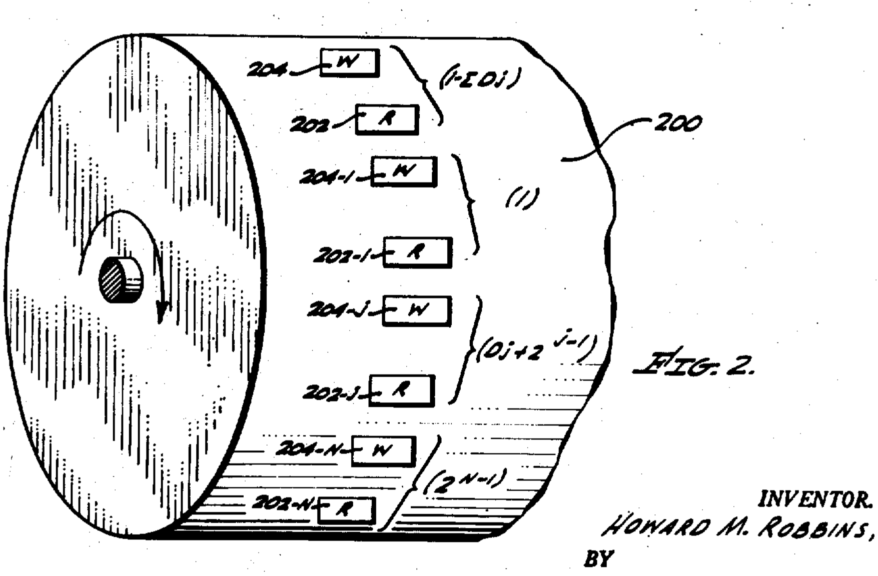
Fig. 2 is a perspective view of a magnetic drum which may be utilized to provide the delay sections shown in Fig. 1.

Referring now to Fig. 2, there is shown a magnetic drum 200 including $n$ tracks or channels for providing a plurality of variable delay sections of the type described above. A reading head 202–$j$ and a writing head 204–$j$ are required for each first delay section. The reading and writing heads are spaced so that the total time interval between the writing of signals by writing head 204–$j$ and the reading of signals by reading head 202–$j$ is equal to $2^{j-1}$ time intervals. Thus, reading and writing heads 202–1 and 204–1 are spaced on the drum so that one time interval elapses between the recording of signals through writing head 204–1 and the reading of corresponding signals by reading head 202–1. It should be understood that the delay in passing signals through reading and writing circuits connected to the reading and writing heads must be included in the total time interval. Thus, if one-tenth of a time interval is required for reading and writing signals on the drum, the spacing of the reading and writing heads on the drum must be less than a space corresponding to one time interval by a space corresponding to one-tenth of a time interval.

Figure 3:
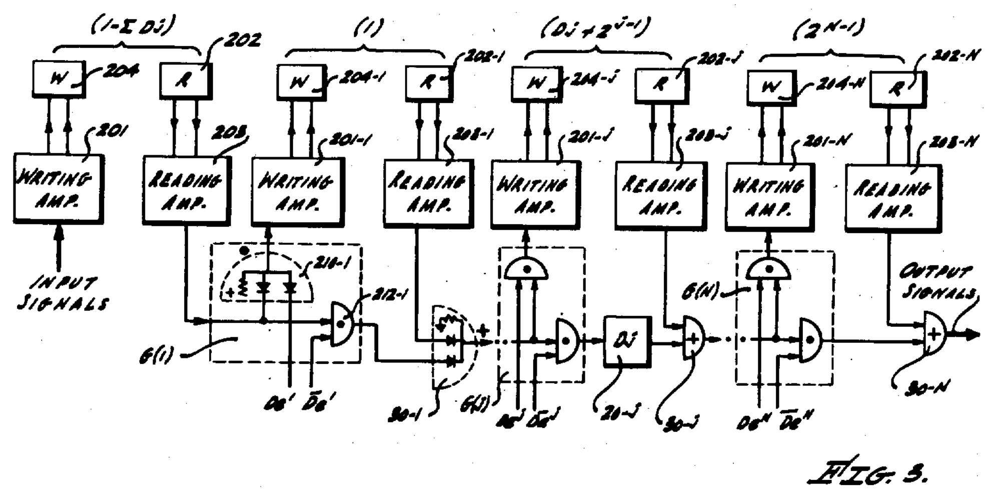
Fig. 3 is a schematic diagram of a variable delay circuit according to Fig. 1, utilizing a magnetic drum to provide the delay sections.

A schematic diagram of one form of variable delay circuit using the magnetic drum shown in Fig. 2 is shown in Fig. 3, where the circuits associated with one of the $n$ channels of drum 200 are illustrated. In the circuit shown in Fig. 3 input signals are applied to a writing or recording amplifier circuit 201 and recorded through writing head 204. The signals thus recorded are read after a delay of $(1-\Sigma D_j)$ time intervals by reading head 202 and reading amplifier circuit 203. Writing amplifier circuit 201, writing head 204, reading head 202 and reading amplifier circuit 203, then, comprise input delay section 5, described above.

Each of the first delay sections 10–$j$ comprises a writing or recording amplifier circuit 201–$j$, a writing head 204–$j$, a reading head 202–$j$ and a reading amplifier circuit 203–$j$; the total delay between the application of signals to writing amplifier circuit 201–$j$ and the production of corresponding signals by reading amplifier circuit 203–$j$ being equal to $D_j+2^{j-1}$ time intervals.

For simplicity, only one second delay section 20–$j$ is shown, although any number may be included. If only one second delay section is used it is preferred that it be introduced into the circuit at a point such that $j$ is approximately equal to N/2; thus making it possible for delay section 20–$j$ to function also as a buffer circuit and thereby reduce the load on gating circuits G($j$).

Each of gating circuits G($j$) comprises two "and" circuits 210–$j$ and 212–$j$; "and" circuits 210–$j$ producing output signals in response to applied input signals whenever signal $De^j$ is equal to 1, and "and" circuits 212–$j$ producing output signals in response to applied input signals whenever signal $\overline{De^j}$ is equal to 1. The output signals of "and" circuits 210–$j$ and 212–$j$ are applied, respectively to delay sections 10–$j$ and 20–$j$.

The signals produced by reading amplifier circuits 203-$j$ and those produced by delay sections 20-$j$ (or "and" circuits 212-$j$, where delay section 20-$j$ is omitted) are combined in "or" circuits 30-$j$ to produce signals which are then applied to the following gating circuit G($j$+1).

"And" and "or" circuits suitable for use in variable delay circuits of the present invention are well known in the art; suitable circuits, for example, being described on pages 37 to 45 of "High-Speed Computing Devices" by Engineering Research Associates, published in 1950 by McGraw-Hill Book Company, Inc., New York and London, and in an article entitled "Diode Coincidence and Mixing Circuits in Digital Computers" by Tung Chang Chen, in volume 38 of Proceedings of the Institute of Radio Engineers, on pages 511 through 514. As a specific illustration, diode "and" and "or" circuits are shown in "and" circuit 210-1 and "or" circuit 30-1. Since the operation of these circuits is amply described in the abovementioned articles, further discussion is deemed unnecessary.

From the foregoing description it is apparent that the present invention provides a novel variable delay circuit for producing output signals in response to applied input signals after a predetermined delay, the delay being represented and controlled by electrical signals in a predetermined binary code.

The invention has been described with particularity concerning an embodiment utilizing first delay sections, providing delays specified in accordance with a geometric progression in powers of 2, and second delay sections providing a constant delay. It should be apparent, however, that each second delay section may be considered as a bypass circuit, having a constant delay $D_j$. On the other hand, the present invention also contemplates bypass circuits having no delay, provided that the constant delay $D_j$ is eliminated from each of the corresponding first delay sections.

While the embodiments described above have included first delay sections including delays weighted according to a series: 1, 2, 4, . . . , it is possible to rearrange the terms of the series, providing that a corresponding rearrangement is included in the control signals. Thus, the first delay sections may be weighted according to the series: 4, 8, 1, 16, and 2; where N is equal to 5.

It has been suggested that the binary control signals could be stored in flip-flops producing corresponding complementary output signals; it is also possible, however, to control variable delay circuits according to the present invention with single control signals, where the presence of a control signal represents binary 1, and the absence thereof, binary 0. A circuit suitable for gating applied signals to a first delay section when the control signal is present, and for gating applied signals to the corresponding bypass circuit when the control signal is absent is shown and described in copending U. S. patent application Seral No. 308,045, for "Complementary Signal Generating Networks" by Daniel L. Curtis, filed September 5, 1952.

While the first delay sections and bypassing second delay sections have been considered as separate devices, it is apparent that they may be considered as part of the same delay network, where the delay network includes a delay circuit and a bypass circuit which may also include a delay.

Where a minimum of delay sections are desired the binary system described above is preferred. It is possible, however, to construct variable delay circuits according to the present invention which are not based upon a binary code. Consider, for example, a variable delay circuit based upon a ternary code, where each of the control signals may have any one of three levels: 0, 1, or 2. In a circuit of this type, the $j$th delay network includes a bypass circuit which may have a delay of $D_j$, a first delay circuit having a delay of $D_j+3^{j-1}$, and a second delay circuit having a delay of $D_j+2.3^{j-1}$. This analysis may be extended to a system based upon any radix, provided of course that the control signals have a number of levels equal to the radix.

While specific structure has been shown and incorporated by reference to certain publications, it should be apparent that many substitutions may be made without departing substantially from the spirit of the invention.

What is claimed as new is:

1. An electrical circuit responsive to a series of multilevel control signals for delaying an applied electrical input signal for a period determined by said control signals, said electrical circuit comprising: a series of electrical delay networks, corresponding to said control signals, respectively, each of said delay networks including at least one delay circuit and a bypass circuit coupled in parallel with said one delay circuit; and a series of electrical gating circuits, one associated with each of said electrical delay networks, each of said electrical gating circuits being responsive to a different one of said control signals for applying the network output signal produced by the preceding delay network in said series to the delay circuit in the associated delay network when the corresponding multilevel control signal is at a first level, and for applying said network output signal to the bypass circuit in the associated delay network when the corresponding multilevel control signal is at a second level.

2. An electrical circuit for producing output signals corresponding to applied input signals after a predetermined delay, the delay being represented and controlled by binary control signals in a predetermined binary code, each of the control signals having a first level representing binary 1 and a second level representing binary 0, said electrical circuit comprising: a series of delay networks, each of said networks including a delay circuit and a bypass circuit connected in parallel with said delay circuit, each delay circuit producing output signals in response to applied input signals after a delay specified in accordance with a different term of a geometric series in powers of 2; and a series of electrical gating means, one associated with each of said delay networks, each of said electrical gating means being responsive to one of said binary control signals for applying the network output signal produced by the preceding delay network in said series to the delay circuit in the associated delay network when said one binary control signal is at said first level, and for applying said network output signal to the bypass circuit in the associated delay network when said one binary control signal is at said second level.

3. The electrical circuit defined in claim 2 wherein said series of delay networks includes N delay networks; wherein the terms of said geometric series are defined by the function $D_j+2^{j-1}$, where $j$ is any of the integers 1 through N and $D_j$ is independent of $j$; wherein each of said delay circuits produces output signals in response to applied input signals after a delay of $D_j+2^{j-1}$ reference time intervals; and wherein each of said bypass circuits includes a delay section providing a delay of $D_j$ reference time intervals.

4. An electronic variable delay circuit for producing output signals in response to applied input signals after a predetermined delay, the delay being represented and controlled by 1st, . . . $j$th, . . . and Nth complementary pairs of binary control signals, in a predetermined binary code, where $j$ is any of the integers 1 through N, said variable delay circuit comprising: 1st, . . . $j$th, . . . and Nth delay sections, said delay sections including means for delaying signals $2^{j-1}$ time intervals, respectively; 1st, . . . $j$th, . . . and Nth bypass-circuit means coupled in parallel to said 1st, . . . $j$th, . . . and Nth delay sections, respectively; 1st, . . . $j$th, . . . and Nth electrical gating circuits coupled to said 1st, . . . $j$th, . . . and Nth delay sections, respectively, said $j$th electrical gating circuit being responsive to one of the binary control signals in said $j$th complementary pair for gating applied signals to said $j$th delay section and being responsive to the other of said binary control signals in said $j$th complementary pair for gating applied signals to said $j$th bypass-circuit means; and 1st, . . . $j$th, . . . and Nth buffer means for combining signals produced by said $j$th bypass-circuit means and said $j$th delay section and applying the combined signals to the $(j+1)$st electrical gating circuit.

5. An electrical variable delay circuit for producing output signals in response to applied input signals, after a predetermined delay, the delay being represented and controlled by 1st, . . . $j$th, . . . and Nth complementary pairs of binary control signals designated as $De^1$, $\overline{De}^1$; . . . $De^j$, $\overline{De}_j$; . . . and $De^N$, $\overline{De}^N$, respectively, where $j$ is any of the integers 1 through N, said electronic circuit comprising: 1st, . . . $j$th, . . . and Nth first delay sections providing delays of $D_j+2^{j-1}$ time intervals, respectively, where $D_j$ is independent of $j$; 1st, . . . $j$th, . . . and Nth second delay sections providing delays of $D_j$ time intervals; an input delay section providing a delay of $1-\Sigma D_j$, where $\Sigma D_j$ is equal to the sum of said delays $D_j$; 1st, . . . $j$th, . . . and Nth electrical gating circuits designated as G(1), . . . G($j$), . . . and G(N), respectively, said electrical gating circuits G($j$) being connected to said $j$th delay sections, and being responsive to signals $De^j$ and $\overline{De}^j$ for gating applied input signals to said $j$th first delay section and said $j$th second delay section, respectively; and 1st, . . . $j$th, . . . and Nth "or" circuits for combining signals produced by said 1st, . . . $j$th, . . . and Nth delay sections, respectively, the output signals of said $j$th "or" circuit being applied to the $(j+1)$st electrical gating circuit.

6. The electrical variable delay circuit defined in claim 5, which also includes a magnetic drum for providing said N first delay sections, each of said first delay sections then including a writing amplifier circuit, a writing head for recording signals produced by said writing amplifier circuit onto said magnetic drum, a reading head for reading signals thus recorded after a predetermined delay, and a reading amplifier circuit responsive to signals produced by said reading head for producing output signals corresponding to signals applied to said writing amplifier circuit after a delay of $D_j+2^{j-1}$ time intervals.

References Cited in the file of this patent

UNITED STATES PATENTS

| Number | Name | Date |
|---|---|---|
| 2,403,561 | Smith | July 9, 1940 |
| 2,522,609 | Gloess | Sept. 19, 1950 |